(12) United States Patent
Oudet et al.

(10) Patent No.: US 6,249,065 B1
(45) Date of Patent: Jun. 19, 2001

(54) ELECTROMAGNETIC ACTUATOR WITH TWO MOBILE PARTS IN PHASE OPPOSITION

(75) Inventors: Claude Oudet; Didier Frachon, both of Besancon (FR)

(73) Assignee: MMT SA, Fribourg (CH)

(*) Notice: Subject to any disclaimer, the term of this patent is extended or adjusted under 35 U.S.C. 154(b) by 0 days.

(21) Appl. No.: 09/463,997
(22) PCT Filed: Jul. 31, 1998
(86) PCT No.: PCT/FR98/01718
    § 371 Date: Jun. 19, 2000
    § 102(e) Date: Jun. 19, 2000
(87) PCT Pub. No.: WO99/10969
    PCT Pub. Date: Mar. 4, 1999

(30) Foreign Application Priority Data

Aug. 22, 1997 (FR) .................................................. 97 10585

(51) Int. Cl.[7] .................................................. H02K 33/16
(52) U.S. Cl. .................................................. 310/33; 310/12
(58) Field of Search .................................................. 310/12, 13, 14, 310/22, 29, 33, 36, 38; 318/135

(56) References Cited

U.S. PATENT DOCUMENTS 5,175,457 * 12/1992 Vincent .................................. 310/15
5,208,498 * 5/1993 Hamajima .............................. 310/12

FOREIGN PATENT DOCUMENTS 0 228 055 * 7/1987 (EP) .
WO 97/29534 * 8/1997 (WO) .

* cited by examiner

Primary Examiner—Elvin Enad
Assistant Examiner—Judson H. Jones
(74) Attorney, Agent, or Firm—Oblon, Spivak, McClelland, Maier & Neustadt, P.C.

(57) ABSTRACT

An electromagnetic actuator including a fixed stator having two poles. The stator includes one or two excitation coils. The actuator further includes a mobile part provided with thin permanent magnets magnetized along an air gap direction. The mobile member includes at least two independent elements which are each mobile along directions parallel to the air gap plane intersection and the fixed stator median plane, in opposite directions. Each of the mobile parts has three thin magnets alternately magnetized, which are either integral or not with a yoke made of soft material. The thin magnets of the mobile elements are magnetized along a direction opposite to the corresponding thin magnets of the second mobile element or of the adjacent element, the yokes defining with a fixed stator part a yoke.

9 Claims, 9 Drawing Sheets

ELECTROMAGNETIC ACTUATOR WITH TWO MOBILE PARTS IN PHASE OPPOSITION

BACKGROUND OF THE INVENTION

1. Field of the Invention

The present invention relates to the field of electromagnetic actuators which produce alternating movement.

2. Discussion of the Background

Such actuators are provided in known manner with a central pole and two lateral poles. The central pole supports an exciting coil as well as a mobile portion equipped with thin permanent magnets magnetized along the direction of the air gap. German Patent DE 2603681 describes such an actuator. This actuator is provided with a fixed coil which generates an alternating flux and with two mobile magnets which are displaced in opposite senses. The electromagnetic phenomena involved obey Laplace's law (flux passing through the coil due to magnets). The magnets are not pairs of thin magnets attached to one another in opposite senses, but are two magnetic bars, each interacting with the magnetic flux created by the coil.

Such a prior art actuator suffers from major disadvantages: the structure obeying Laplace's law does not guarantee linearity of the relationship between force and the current supplying the coil. Furthermore, the efficiency of such actuators, or in other words the force per applied watt, is low. The lack of linearity leads to operating irregularity, and makes it necessary to provide complex automatic control electronics to remedy such linearity defects.

A solution to this general problem was provided by the Applicant in the form of European Patent EP 93910083.0, which describes an actuator exhibiting three stator poles and a single coil surrounding the central pole. This solution comprises using a fundamentally different electromagnetic structure, which does not obey LAPLACE's law. The proposed structure is provided with two pairs of thin magnets, which are attached to one another in alternating senses and which are displaced in an air gap.

It has become apparent with prior art devices that the vibration frequency of the mobile member is limited. As soon as the frequency is increased, the force delivered per unit of electrical power dissipated decreases, thus limiting the performances of the actuator constructed by application of European Patent EP 93910083.0. The objective of the invention is to extend the limits of vibrational frequencies by proposing a structure capable of increasing the electromagnetic efficiency.

SUMMARY OF THE INVENTION

For this purpose, the invention relates in its most general sense to an electromagnetic actuator provided with a fixed stator having two poles, the said stator being provided with at least one exciting coil supplying the two poles, the actuator additionally being provided with a mobile portion comprising at least two independent elements, each mobile in opposite senses along directions parallel to the intersection of the plane of the air gap and the central plane of the fixed stator, each of the mobile elements being equipped with thin permanent magnets magnetized transversely along the direction of the air gap, characterized in that each of the mobile elements has three thin magnets magnetized in alternating senses, which magnets may or may not be integral with a yoke of soft material, the said thin magnets of one of the said mobile elements being magnetized along the sense opposite to that of the corresponding thin magnets of the second mobile element, the yoke and fixed stator part defining therebetween the air gap E.

Advantageously, the mobile member comprises two parts which are mobile in opposition, each of the said mobile parts being joined to the fixed stator by elastically deformable means in order to allow clearance along the mobility direction while maintaining a substantially constant air gap E.

According to a preferred embodiment, the joint between each of the mobile parts and the fixed stator is ensured by leaf springs extending substantially perpendicular to the plane of the air gap.

According to another alternative embodiment, the length Xc of the stator poles is greater than or equal to the travel X of the mobile member plus a length substantially equal to E.

Preferably the distance e separating the central pole and each of the lateral poles is greater than or equal to 0.5 E, where E denotes the width of the air gap.

According to an advantageous embodiment, the actuator has a latching force which tends to restore the mobile part to central position.

According to a preferred embodiment, each of the mobile elements comprises a mobile yoke integral with the three permanent magnets magnetized transversely in alternating senses.

BRIEF DESCRIPTION OF THE DRAWINGS

Preferably the cumulative length of the three magnets of a mobile element is greater than the length of the yoke of the said mobile element.

The invention will be better understood upon reading the description hereinafter, with reference to the attached drawings, wherein.

DESCRIPTION OF THE PREFERRED EMBODIMENTS

The invention will be described with reference first of all to FIGS. 1A and 1B, which illustrate schematic views of two alternative embodiments of the invention. The present invention relates to an electromagnetic actuator provided with two stator poles (1, 2). This actuator comprises two stator poles, each supporting an exciting coil (3, 4) in the alternative embodiment illustrated with reference to FIG. 1A, or a single winding (5) feeding the two poles in the practical example illustrated with reference to FIG. 1B. The actuators according to the invention are also provided with a mobile portion (6) equipped with thin permanent magnets magnetized along the direction of the air gap.

The objective of the invention is to provide a high-performance and reliable actuator of small overall size for applications which necessitate alternating displacement at elevated frequency, which actuator has a magnetostatic relaxation force of the same sign as the restoring force of the suspension.

Figure 2:
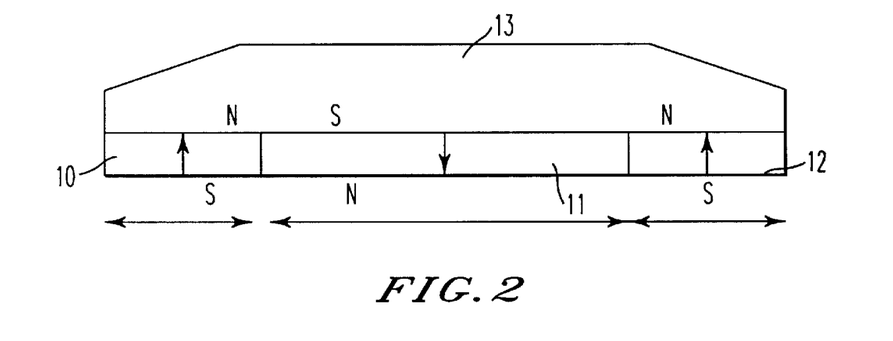
FIG. 2 illustrates a view through a cross-sectional plane of one of the mobile elements.

FIG. 2 illustrates a view through a cross-sectional plane of one of the mobile elements.

The mobile member of the actuator according to the invention comprises at least two independent parts which are mobile in opposite senses along a direction parallel to the intersection of the plane of the air gap and the central plane of the fixed stator part. Each of the mobile parts has three thin magnets (10, 11, 12) magnetized transversely in alternating senses. In the example described with reference to FIG. 2, the magnets (10 to 12) are integral with a yoke (13) of soft material. The thin magnets (10 to 12) of each of the mobile elements are magnetized along the sense opposite to that of the corresponding thin magnets of the adjacent mobile element, the yokes and fixed stator part defining therebetween the air gap E.

In central position, the transitions between the three magnets (10 to 12) of one of the mobile portions are aligned with the poles of the stator. $L_{a2}$ is therefore equal to the distance between the stator poles plus the width $X_c$ of one of the poles.

Length $L_{a1}$ makes it possible to optimize the force generated by such an actuator while limiting the volume of magnets. Length Xc of the central stator pole is greater than or equal to the travel X of the mobile member plus a length substantially equal to E.

In order to increase the volume of copper without increasing the exterior sides of the actuator, the two stator poles (1, 2) are prolonged by a portion of cross section smaller than their own cross section. The cross sections of the portions formed in this way are dimensioned so as to permit the passage of magnetic flux under nominal conditions without saturation.

Preferably the mobile member (6) comprises two mobile elements vibrating in opposition (canceling out the total quantity of movement), each of the said mobile elements being joined to the fixed stator part by deformable means to permit clearance in the mobility direction while maintaining a substantially constant air gap E. In order to cancel out the torque created by the displacement of the two rotors in opposite senses, the use of two half rotors and of one complete rotor makes it possible to cancel out the total component of the torque, as described in FIG. 5.

Figure 3:
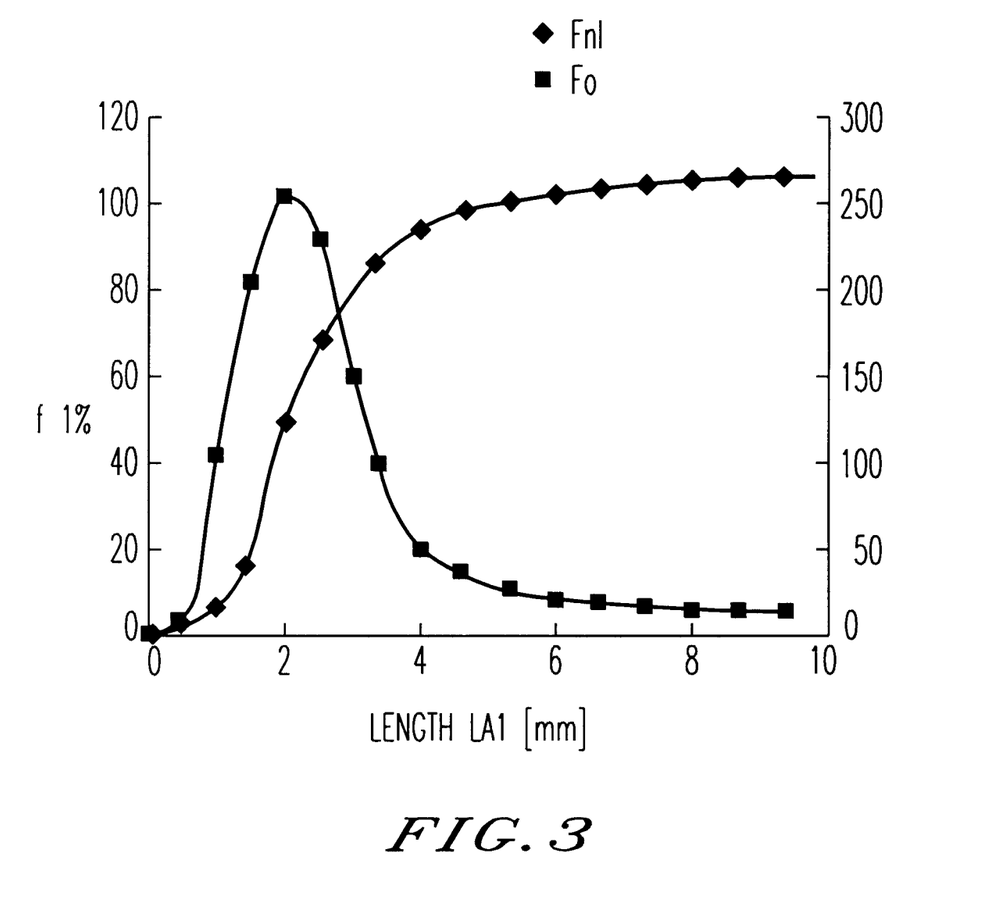
FIG. 3 illustrates the curve of evolution of the restoring force as a function of the length of the lateral magnets.

FIG. 3 illustrates the curve of evolution of restoring force as a function of the length $L_{a1}$ of the lateral magnets (10, 12). This curve illustrates the percentage increase of the force due to the current Fni as a function of the length La1 of the magnet relative to the force generated by a unipolar magnet of length La2 (for La2=9 mm).

FIG. 3 shows that, for a given current, the force created increases very rapidly with increase of $L_{a1}$. The overhang of the magnet therefore does not necessarily have to be as large as possible, because the force also tends very rapidly to a limit, and so the magnet volume and therefore costs can be minimized. FIG. 3 also shows the evolution of the restoring force F0 (currentless force), which tends to return the rotor to central position.

Figure 1A:
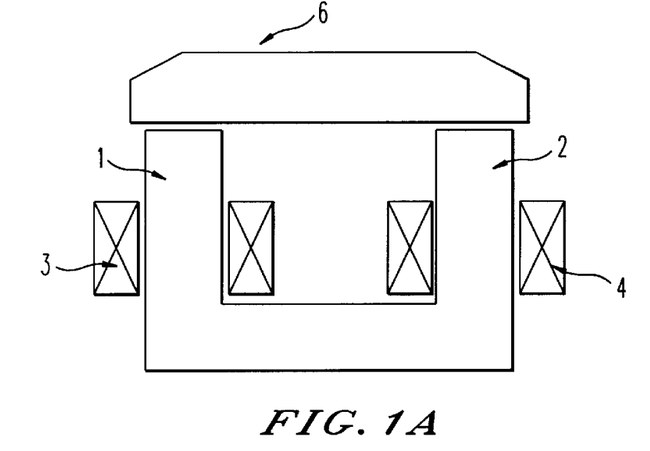
FIGS. 1A and 1B illustrate schematic views of two alternative embodiments of the invention.
Figure 1B:
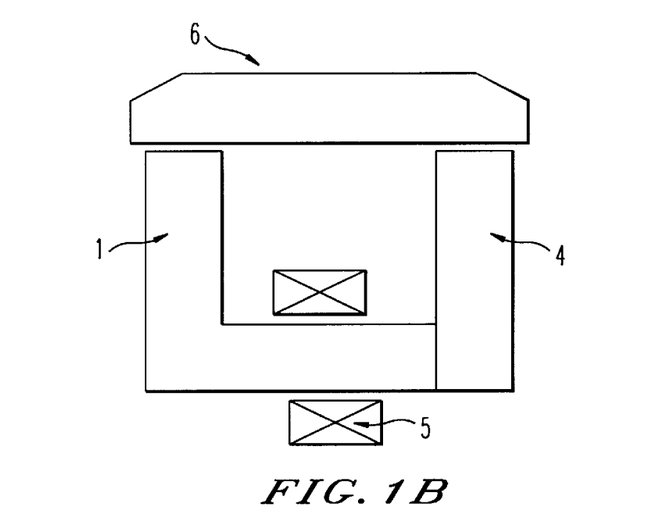

For an actuator according to the invention, the force generated is equal to:

$$F = 2*2B_r\frac{L}{E}ZnI \quad \text{Alternative embodiment of FIG. 1A}$$

$$F = 2B_r\frac{L}{E}ZnI \quad \text{Alternative embodiment of FIG. 1B}$$

where Br is the remanence of the magnet, L its thickness, Z the width of the magnet, E the air gap which includes the magnet, and nI the current in the coil or coils.

The displacement of the mobile elements is in principle linear. However, the actuator according to the invention can also be constructed in cylindrical form. In this case the displacement of the mobile parts describes arcs of circles inscribed in a cylinder which is coaxial with the air gap, which has cylindrical shape in this embodiment.

Figure 4A:
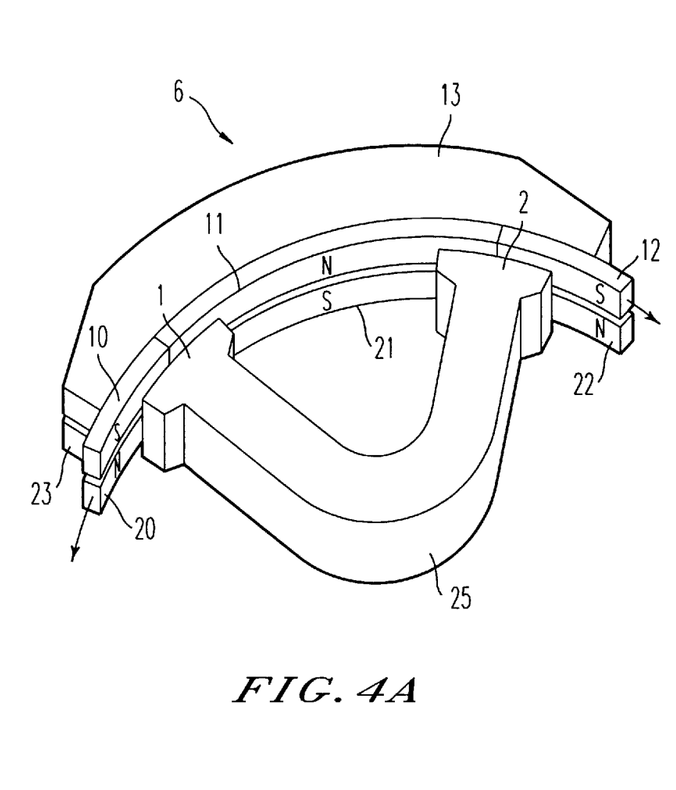
FIGS. 4A and 4B illustrate perspective views of two alternative embodiments of actuators of cylindrical geometry according to the invention.
Figure 4B:
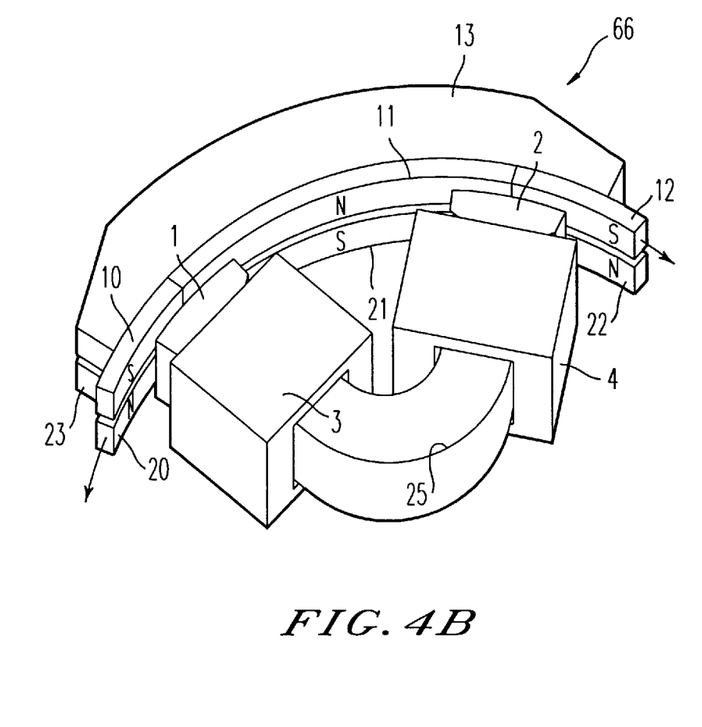

FIGS. 4A and 4B illustrate perspective views of two alternative embodiments of actuators of cylindrical geometry according to the invention.

The alternative embodiments differ simply by the number of coils, or in other words a single coil for the alternative embodiment illustrated with reference to FIG. 4A and two coils for the alternative embodiment illustrated with reference to FIG. 4B.

In this embodiment of cylindrical geometry, the mobile portion (6) comprises two mobile elements displaced in rotation in opposite senses. Each of the mobile elements is formed by a yoke (13, 23) shaped as an arc of a circle, on which there are fixed thin magnets (10, 11, 12) and (20, 21, 22) respectively. These magnets also have the shape of an arc of a circle. The magnetization is oriented radially and it alternates both for magnets (10 to 12) fixed on the same yoke (13) and for two adjacent magnets (10, 20) or (11, 21) or (12, 22) fixed on two adjacent yokes (13, 23).

The stator has two branches forming stator poles (1, 2), which are joined by a curved branch (25).

Lateral magnets (10, 20) and (12, 22) jut out from yokes (13, 23). The cumulative length of magnets (10 to 12) fixed to the same yoke exceeds the length of the said yoke (13).

Figure 5:
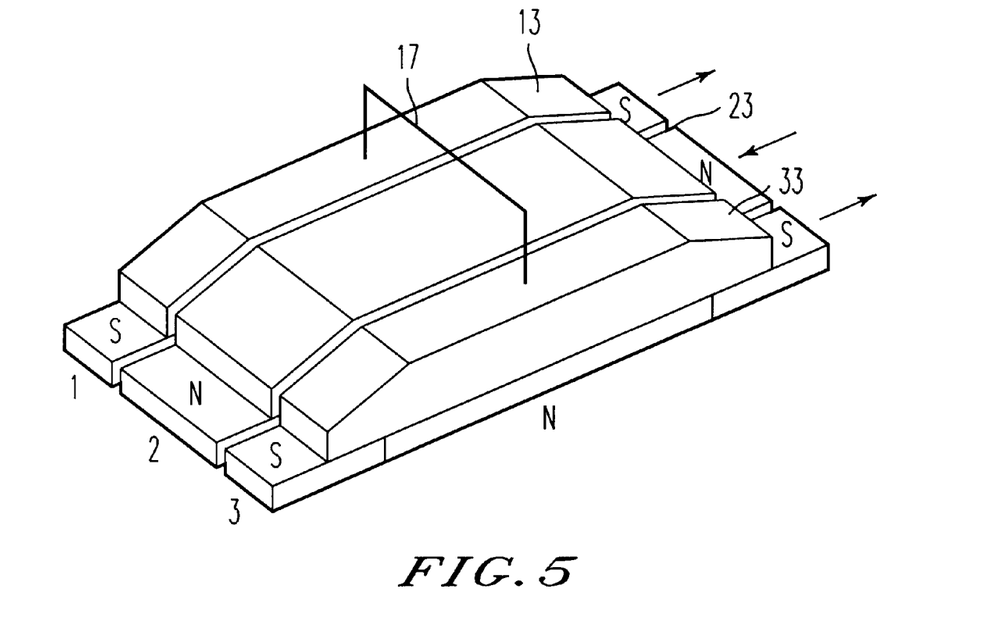
FIG. 5 illustrates an alternative embodiment of the mobile portion of an actuator according to the invention.

FIG. 5 illustrates an alternative embodiment of the mobile portion of an actuator according to the invention. In this alternative embodiment, the mobile portion comprises three mobile parts (13, 23, 33) constructed in three portions in order to cancel out the parasitic torsional torque. The two external mobile parts (13, 33) are coupled mechanically. The width of the central mobile element (23) is equal to the sum of the widths of the lateral mobile elements. Advantageously, the joint between each of the mobile elements and the fixed stator portion is assured by leaf springs extending substantially perpendicular to the plane of the air gap.

Figure 6A:
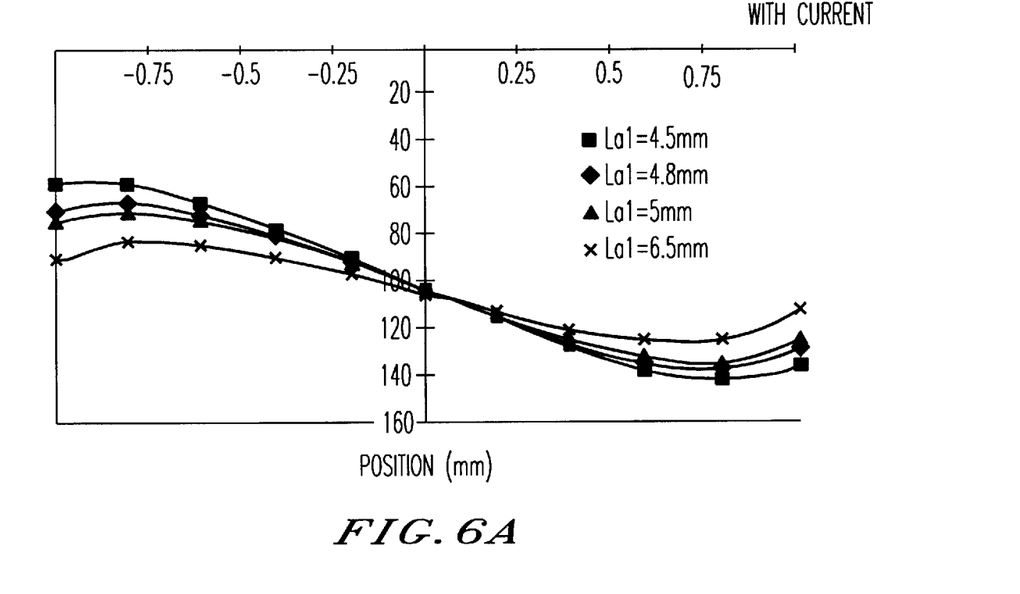
FIGS. 6A and 6B illustrate the curves of force versus position with and without current respectively.
Figure 6B:
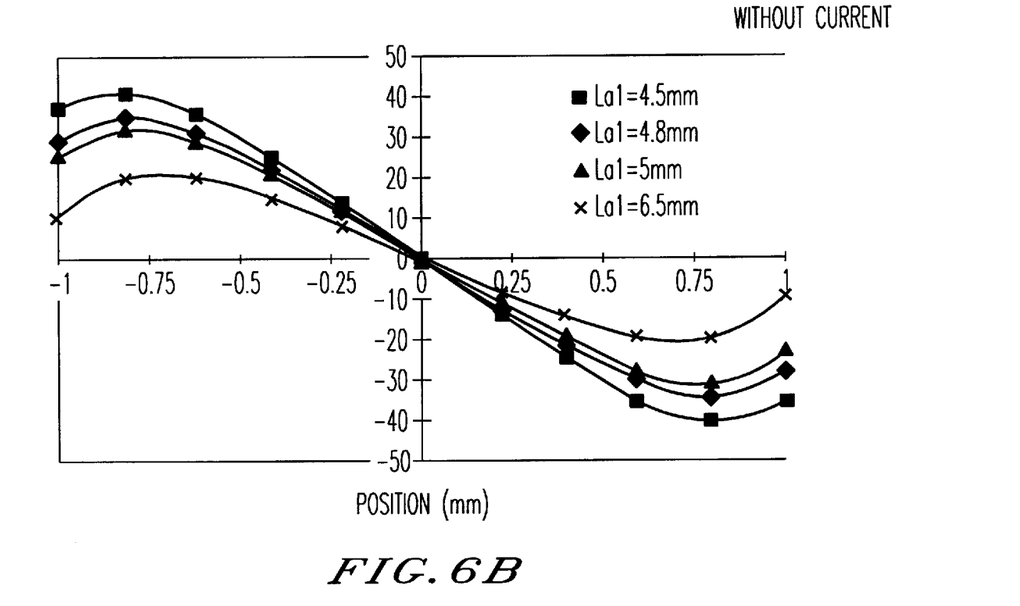

FIGS. 6A and 6B illustrate the curve of force versus position with and without current respectively. The two types of actuators exhibit a magnetostatic force which tends to restore the mobile portions to central position. This force can be used to compensate for part of the stiffness of the leafs, thus diminishing the stresses. FIG. 6A illustrates the force produced by such an actuator as a function of the position of the mobile elements. The force is given for a nonzero current nI and for a zero current (magnetostatic force). FIGS. 6A and 6B illustrate the two forces (with and without current respectively) for several magnet lengths La1.

Figure 7A:
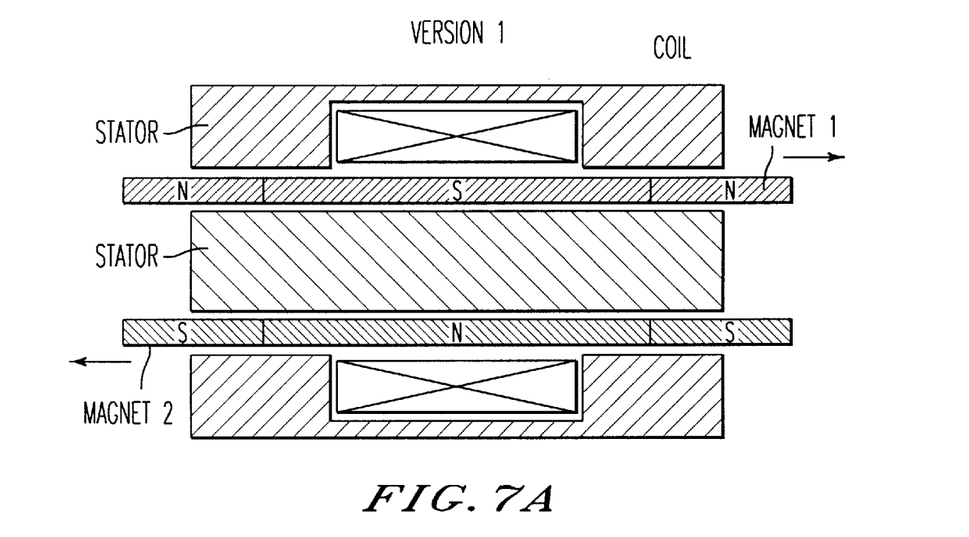
FIGS. 7A and 7B illustrate perspective views of two alternative embodiments of actuators of tubular geometry according to the invention.
Figure 7B:
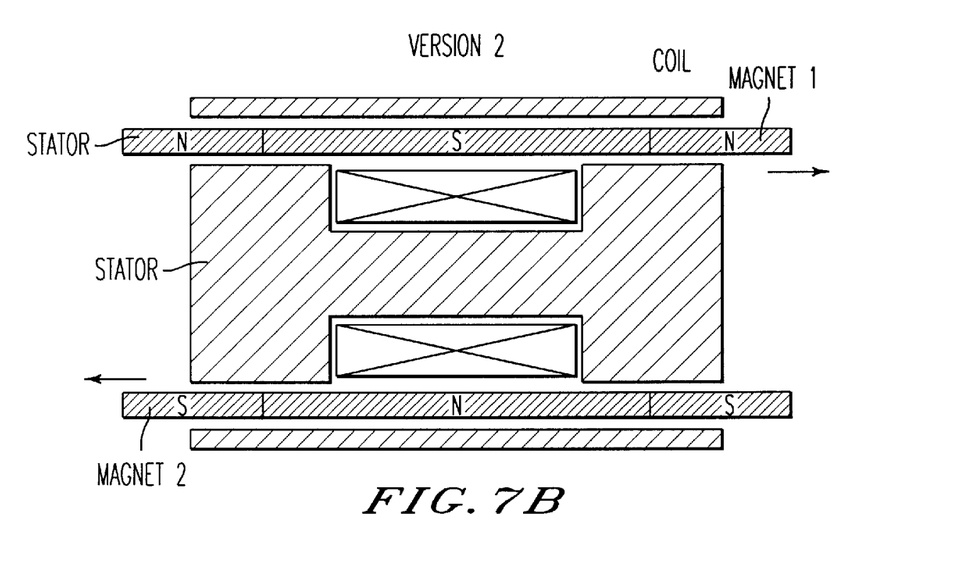

FIGS. 7A and 7B illustrate perspective views of two alternative embodiments of actuators of tubular geometry according to the invention. The actuator has axial symmetry. In this case, the stator structure (40) as well as the rotor are of cylindrical type. The rotor (41) is mobile, specifically in translation along an axis Y corresponding to the axis of curvature of the cylindrical stator structure and of the rotor.

In the example with reference to FIG. 7A, the stator is a soft-iron tubular part having an interior seat of annular shape in which there is placed the exciting coil (5). The two ends (1, 2) form the stator poles.

In the example with reference to FIG. 7B, the stator is a soft-iron part of cylindrical shape having an exterior annular seat in which there is placed the exciting coil (5). The two ends (1, 2) form the stator poles.

The two mobile portions are suspended on leaf springs.

Figure 8A:
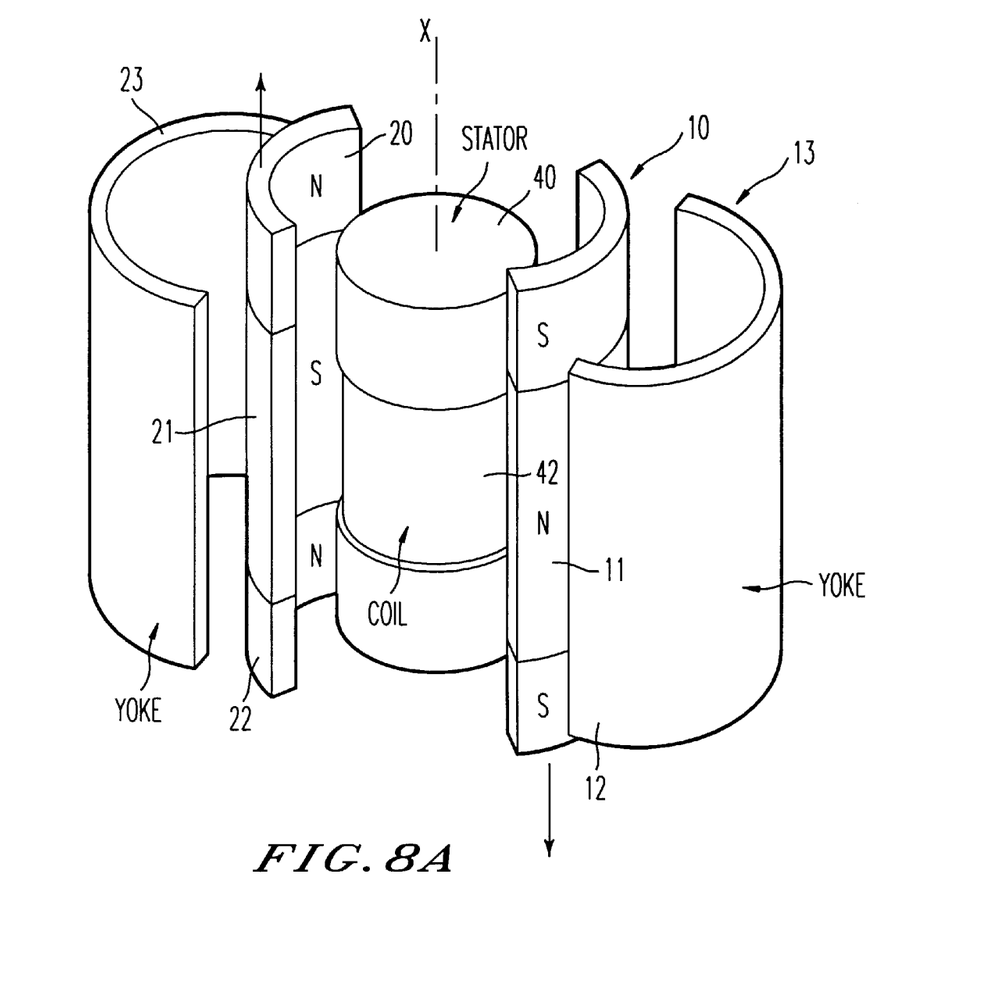
FIGS. 8A and 8B illustrate exploded views of two alternative embodiments of actuators of tubular geometry according to the invention.
Figure 8B:
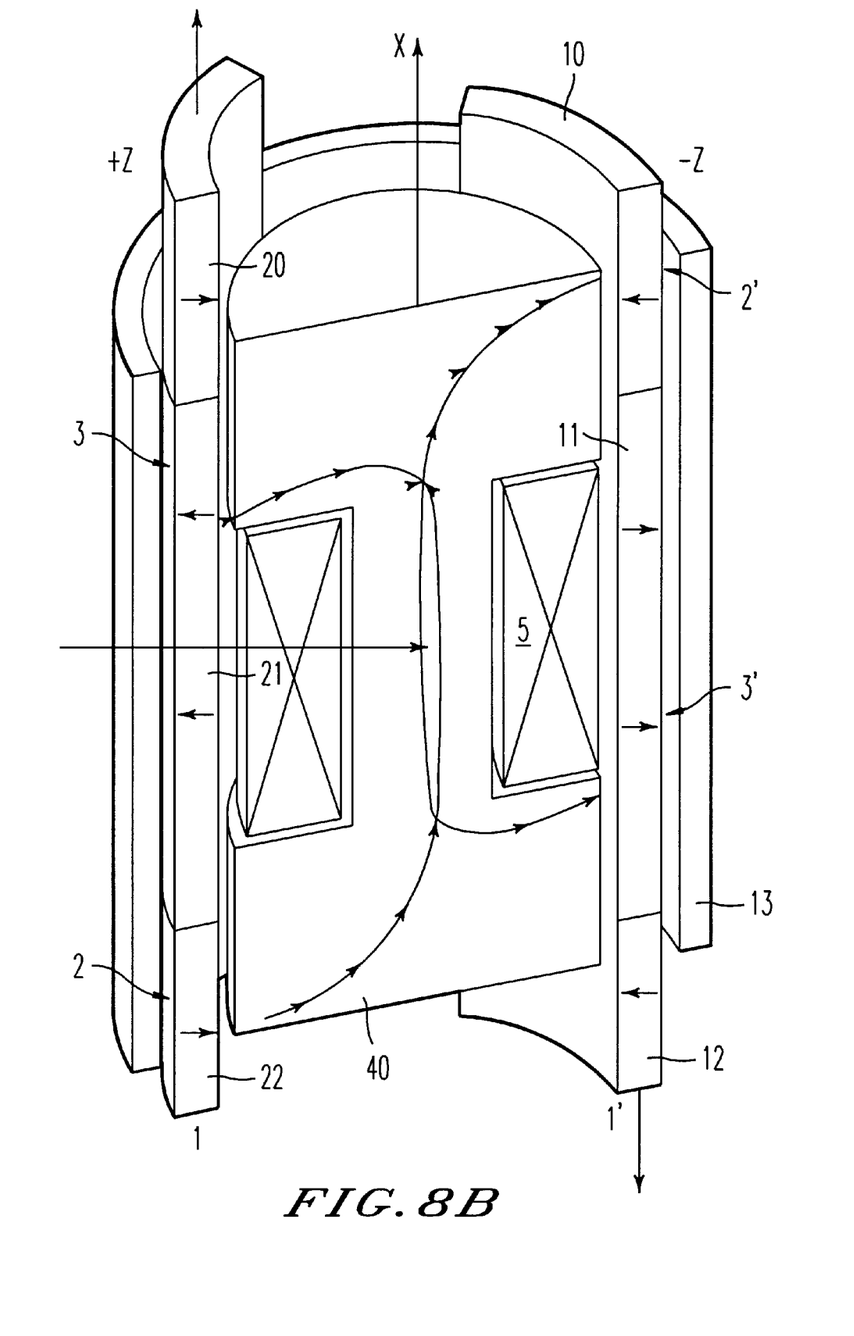

FIGS. 8A and 8B illustrate exploded views of two alternative embodiments of actuators of tubular geometry according to the invention, corresponding to the sectional view of FIG. 7A.

Stator (40) is formed by a cylindrical soft-iron part having at its central portion (42) a section of smaller cross section. The coil is seated in the cavity defined by this portion of smaller cross section.

The magnetized structures are formed from three magnets in the form of radially magnetized arcs of a circle. Central magnet (11, 12) is longer than the two lateral magnets (10, 20 and 12, 22). The magnetized structures vibrate in opposite senses. The yoke can be formed by a single part (13) as illustrated in FIG. 8B. In this case it is fixed. The flux-return yoke in FIG. 8B is a tube which is not integral with the magnets. These thin magnets are magnetized in alternating senses, in the thickness direction. The magnets are preferably of the rare-earth type, such as neodymium-iron-boron (NdFeB) magnets with plastic binder of isotropic type.

It can also be formed from two parts (13, 23) forming half tubes. In this case, they can each be integral with one of the magnetized structures, as illustrated in FIG. 8A.

Figure 9A:
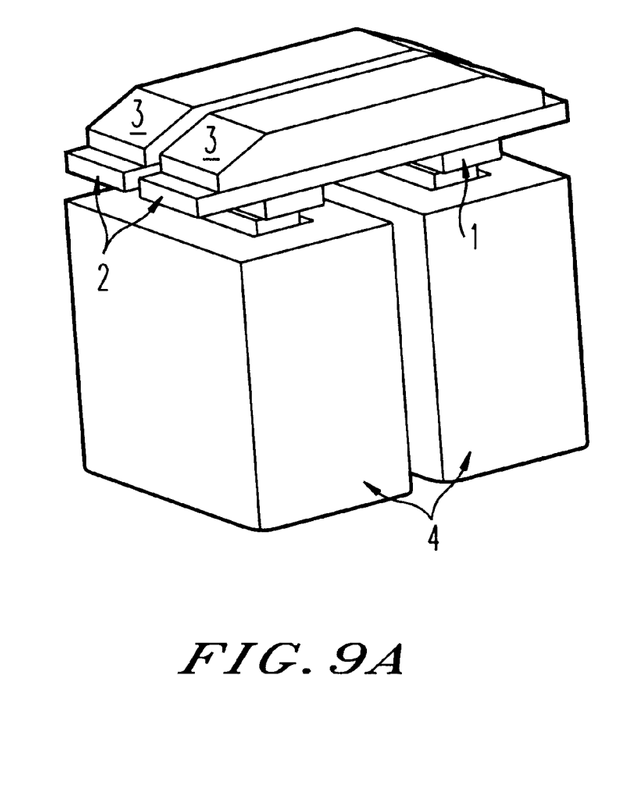
FIGS. 9A and 9B represent perspective views respectively of an alternative embodiment of an actuator with linear displacement according to the invention and of its stator.
Figure 9B:
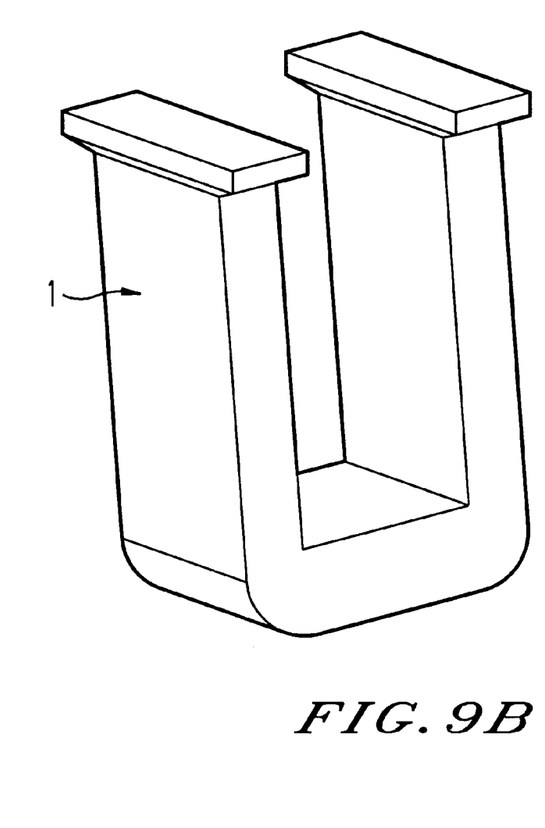

FIGS. 9A and 9B illustrate perspective views respectively of an alternative embodiment of an actuator with linear displacement according to the invention and of its stator. On FIG. 8A and FIG. 8B the length of the yoke is not necessarily equal to the total length of the mobile parts, but can be shorter than the cumulative length of the three magnets, and it is equal to the length of the stator in the example illustrated in FIG. 8A.

It is appropriate to maintain the mobile parts at a small distance from the surface of the stator poles, and to do so over the entire useful travel C. This function can be assured by a deformable joint or by a flexible joint. In the described reference example, this function is achieved by virtue of leaf springs working in alternating flexion with superposition of a tensile force associated with the mean absolute value of the induction in the air gap, said springs comprising thin sheets made of spring steel such as Phynox (trade name) extending perpendicular to the plane of the permanent magnets.

The shape and thickness of the leaf springs are selected with a view to maintaining the mobile parts at the proper distance from the stator, to supporting the stress due to displacement and to fixing the resonance frequency of the mobile part if necessary. A plurality of leafs can be disposed in parallel in order better to withstand the fatigue due to alternating flexion.

In FIG. 8A, the second mobile part is identical to the first mobile part, except for the fact that the magnets are magnetized in senses opposite to those of the adjacent magnets of the first mobile part, when both are in centered rest position relative to the central stator pole.

The two mobile parts are displaced in opposition, by virtue of the opposite polarities of the magnets.

It is to be noted that the use of two mobile parts vibrating in phase opposition makes it possible to reduce the flux which passes through the stator legs. This makes it possible to reduce the magnetic losses and therefore to reduce the overall size and weight of the stator, as is shown in FIG. 8B, in which there is illustrated, for a shift +Z and −Z of the mobile part (1) and of the mobile part (1') respectively, the flux due to the magnets in the actuator of FIG. 8A. The flux passing through the central core of the stator is due to the end of magnet (2) of length Z situated at the bottom of mobile part (1), which flux is closed on the end of magnet (3), also of length Z but having magnetization opposite to that of (2). The situation is similar for mobile part (1') but, by virtue of the inverse polarities of (2) and (2') as well as of (3) and (3'), the flux passes through the central core of the stator in the sense opposite to that created by mobile piece (1), thus causing the flux to be canceled out at the center of the stator.

The present invention is not limited to the two practical examples described in the foregoing. Numerous versions can be envisioned.

What is claimed is:

1. An electromagnetic actuator provided with a fixed stator having two poles, the said stator being provided with at least one exciting coil supplying the two poles, the actuator additionally being provided with a mobile portion comprising at least two independent elements, each mobile in opposite senses along directions parallel to the intersection of the plane of the air gap and the central plane of the fixed stator, each of the mobile elements being equipped with thin permanent magnets magnetized transversely along the direction of the air gap, characterized in that each of the mobile elements has three thin magnets magnetized in alternating senses, which magnets may or may not be integral with a yoke of soft material, the said thin magnets of one of the said mobile elements being magnetized along the sense opposite to that of the corresponding thin magnets of the second mobile element, the yoke and fixed stator part defining therebetween the air gap E.

2. An electromagnetic actuator according to claim 1, characterized in that the mobile member comprises two parts which are mobile in opposition, each of the said mobile parts being joined to the fixed stator by elastically deformable means in order to allow clearance along the mobility direction while maintaining a substantially constant air gap E.

3. An electromagnetic actuator according to claim 2, characterized in that the joint between each of the mobile parts and the fixed stator is ensured by leaf springs extending substantially perpendicular to the plane of the air gap.

4. An electromagnetic actuator according to claim 1, characterized in that the length Xc of the stator poles are greater than or equal to the travel X of the mobile member plus a length substantially equal to E, X, being greater than or equal to Xc.

5. An electromagnetic actuator according to claim 1, characterized in that the distance e separating the central pole and each of the lateral poles is greater than or equal to 0.5 E, where E denotes the width of the air gap.

6. An electromagnetic actuator according to claim 1, characterized in that it has a latching force which tends to restore the mobile part to central position.

7. An electromagnetic actuator according to claim 1, characterized in that each of the mobile elements comprises a mobile yoke integral with the three permanent magnets magnetized transversely in alternating senses.

8. An electromagnetic actuator according to claim 7, characterized in that the cumulative length of the three magnets of a mobile element is greater than the length of the yoke of the said mobile element.

9. An electromagnetic actuator according to claim 1, characterized in that the mobile portion comprises three mobile parts are constructed in three portions in order to cancel out the residual torque. The two external mobile parts are coupled mechanically. The width of the central mobile element is equal to the sum of the widths of the lateral mobile elements.

* * * * *